United States Patent
Luharuka et al.

(10) Patent No.: US 7,481,337 B2
(45) Date of Patent: Jan. 27, 2009

(54) APPARATUS FOR FLUID STORAGE AND DELIVERY AT A SUBSTANTIALLY CONSTANT PRESSURE

(75) Inventors: Rajesh Luharuka, Atlanta, GA (US); Chi-Fu Wu, Atlanta, GA (US); Peter Hesketh, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 694 days.

(21) Appl. No.: 10/922,015

(22) Filed: Aug. 19, 2004

(65) Prior Publication Data

US 2005/0238512 A1   Oct. 27, 2005

Related U.S. Application Data

(60) Provisional application No. 60/565,310, filed on Apr. 26, 2004.

(51) Int. Cl.
*F04F 11/00* (2006.01)

(52) U.S. Cl. .................. 222/386; 222/55; 417/471; 417/472

(58) Field of Classification Search ............. 222/55, 222/95, 99, 100, 386; 417/413.1, 471, 472, 417/474

See application file for complete search history.

(56) References Cited

U.S. PATENT DOCUMENTS

| | | | | |
|---|---|---|---|---|
| 4,136,802 A | * | 1/1979 | Mascia et al. | 222/95 |
| 4,948,350 A | * | 8/1990 | Olbrisch et al. | 417/474 |
| 6,203,296 B1 | * | 3/2001 | Ray et al. | 417/477.7 |
| 6,210,128 B1 | | 4/2001 | Rife et al. | 417/322 |
| 6,296,452 B1 | | 10/2001 | Caren | 417/53 |
| 6,501,654 B2 | | 12/2002 | O'Conner et al. | 361/699 |
| 6,666,658 B2 | | 12/2003 | Takeuchi et al. | 417/322 |
| 6,869,273 B2 | | 3/2005 | Crivelli | 417/53 |
| 6,874,999 B2 | | 4/2005 | Dai et al. | 417/413.2 |

OTHER PUBLICATIONS

Luharuka, et al.; Design, fabrication, and testing of a near constant pressure fuel delivery system for miniature fuel cells; 2004; Sensors and Actuators; A 112; pp. 187-195.

* cited by examiner

*Primary Examiner*—J. Casimer Jacyna
(74) *Attorney, Agent, or Firm*—Thomas, Kayden, Horstemeyer & Risley, LLP

(57) ABSTRACT

Microfluidic pumps, methods of fabrication thereof, and methods of use thereof, as well as method of pumping a fluid, are disclosed.

18 Claims, 11 Drawing Sheets

APPARATUS FOR FLUID STORAGE AND DELIVERY AT A SUBSTANTIALLY CONSTANT PRESSURE

CROSS-REFERENCE TO RELATED APPLICATION

This application claims priority to U.S. provisional application entitled "Constant-Pressure Disc-Type Dispensing Unit" having Ser. No. 60/565,310 filed on Apr. 26, 2004, which is entirely incorporated herein by reference.

STATEMENT REGARDING FEDERALLY SPONSORED RESEARCH OR DEVELOPMENT

The U.S. government may have a paid-up license in this disclosure and the right in limited circumstances to require the patent owner to license others on reasonable terms as provided for by the terms of F33615-01-1-2173 awarded by the United States Air Force.

FIELD OF DISCLOSURE

The present disclosure is generally related to the storage and delivery of fluids. More particularly, the present disclosure is related to an apparatus for the storage and delivery of fluids at substantially constant pressure with high efficiency.

BACKGROUND

Fluid storage and delivery is very important in various miniature fluidic and microfluidic devices and systems. Some exemplary microfluidic or miniature fluidic systems include micro-fuel cells for portable power generation, portable analysis systems for the detection of chemical or biological agents, drug delivery devices and medical diagnostic systems. Most of the existing and proposed microfluidic systems utilize fluid delivery systems that address fluid storage and fluid delivery independently. Consequently, currently proposed and existing fluid delivery systems suffer from, among other issues, integration difficulties, high dead volume, and an inability to store significant or sufficient volumes of fluid.

Additionally, many of the other fluid delivery systems utilize either integrated active micropumps or external miniature active pumps to satisfy the fluid delivery parameters. The power consumption of these pumps causes the efficiency of a microfluidic or miniature fluidic system to suffer. Many micro-fuel cells, for example, operate on very small flow rates at a relatively high pressure that is substantially constant. Micropumps that satisfy the fuel delivery demands of such a system can have a power consumption of anywhere from 1 to 100 mW rendering them unsuitable or less than ideal for use in a micro-fuel cell.

Furthermore, many existing membrane-type micropumps pump fluid with a pulsating flow and are similarly unsuitable for use in a micro-fuel cell, and chemical and biosensor systems that require constant steady flow. Electrokinetic or magneto-hydrodynamic pumps require certain electrical properties in the reservoir fluid in order to operate, and pump fluid at pressures which are too low to act as a viable option for use in micro-fuel cells. Consequently, there is a need to overcome at least some of these disadvantages and/or deficiencies.

SUMMARY

Microfluidic pumps, methods of fabrication thereof, and methods of use thereof, as well as methods of pumping a fluid, are disclosed. Briefly described, one exemplary embodiment, among others, includes a fluid reservoir system, an outlet structure having an outlet port, and a constant force system coupled to the fluid reservoir. The fluid reservoir system includes a fluid chamber for holding a volume of a fluid. The fluid reservoir system is fluidically coupled to the outlet port. The constant force system is adapted to apply a force to the fluid chamber, where the force causes the volume of the fluid to flow out of the fluid chamber and through the outlet port at a substantially constant pressure.

In another embodiment, the microfluidic pump includes a fluid reservoir system, an outlet structure, and a constant torque system. The fluid reservoir system includes a curved fluid chamber and a curved delivery structure rotationally coupled to the constant torque system. The outlet structure includes an outlet port that is in fluidic communication with the fluid reservoir system. The constant torque system includes an output drum, a take-up drum, and a constant torque spring. The output drum is coupled to the fluid reservoir system such that the rotation of the output drum actuates the delivery structure. The constant torque spring is fastened to the output drum and take-up drum such that the constant torque spring applies a torque in substantially opposite directions about the respective axes of rotation of the output drum and the take-up drum is fastened such that the constant torque spring winds around the output drum and the take-up drum.

In another embodiment, the microfluidic pump includes an outlet structure having an outlet port, a fluid reservoir system in fluidic communication with the outlet port, and a constant force system. The fluid reservoir system includes a hollowed channel, a fluid delivery structure disposed within the hollowed channel, and a compressible fluid chamber disposed within the hollow channel interposed between the fluid delivery structure and the outlet structure. The constant force system includes a constant force spring fastened by each end to the base on substantially opposite sides of the base and routed over the top of the fluid delivery structure between its fastening points.

One method of pumping fluid, among others, includes: providing a fluid reservoir system coupled to an outlet structure having an outlet port, wherein the fluid reservoir system includes a fluid chamber having a volume of fluid; providing a constant force system coupled to the volume of fluid reservoir system; and applying a constant force on the fluid chamber using the constant force system, wherein the constant force applied to a constant contact area of the piston causes the volume of the fluid to flow through the outlet port at a substantially constant pressure.

Another method of pumping fluid, among others, includes: providing a fluid reservoir system fluidically coupled to an outlet structure having an outlet port, wherein the fluid reservoir system includes a fluid chamber having a volume of fluid; providing a constant torque system rotationally coupled to the fluid reservoir system; and applying a constant torque on the volume of fluid using the constant torque system, wherein the constant torque applied to a constant contact area of the piston causes the volume of the fluid to flow through the outlet port at a substantially constant pressure.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure.

DETAILED DESCRIPTION

Microfluidic fluid delivery devices and systems, methods of operating the devices and systems, and methods of using the devices and systems, are disclosed. In general, the microfluidic fluid delivery systems and devices are capable of storing and delivering (e.g., pumping) a volume of a fluid at a substantially constant pressure over time (e.g., minutes/hours/days) depending on the application. In addition, the microfluidic fluid delivery systems and devices are capable of delivering the fluid in a very energy efficient manner by consuming little or no power during delivery of the fluid. In particular, the microfluidic fluid delivery systems and devices only use the energy inherent in one or more displacement systems incorporated (e.g., a constant force spring) in the microfluidic fluid systems and devices. Presently, microfluidic fluid delivery systems generally operate with fluid volumes from a few hundred microliters to tens of milliliters.

As mentioned above, the fluid delivery systems and devices include displacement mechanisms that are able to apply a force to a fluid reservoir system. The fluid reservoir system includes a fluid such as, but not limited to, a gas, a liquid, and combinations thereof. In particular, the fluid can include, but is not limited to, a fuel (e.g., a hydrocarbon (methanol), hydrogen, and the like), water, medications, chemicals, reagents, drugs, proteins, antibodies, enzymes, oligonucleotides, peptides, and biological samples. The force applied to the reservoir system results in an increase in fluid pressure within the fluid reservoir system. In addition, the displacement mechanism is able to apply a constant force while the fluid is displaced from the reservoir system over time. In other words, the displacement mechanism causes an increase in pressure within the reservoir system and upon opening an outlet port, which fluidically communicates with the reservoir system, the volume of the fluid flows out of the reservoir system through the outlet port at a constant pressure over time. The displacement mechanism can apply a constant force over a time of seconds, minutes, hours, days, or weeks. The fluid delivery system can be designed to apply a constant force over the time frame appropriate for the particular application.

Figure 1:
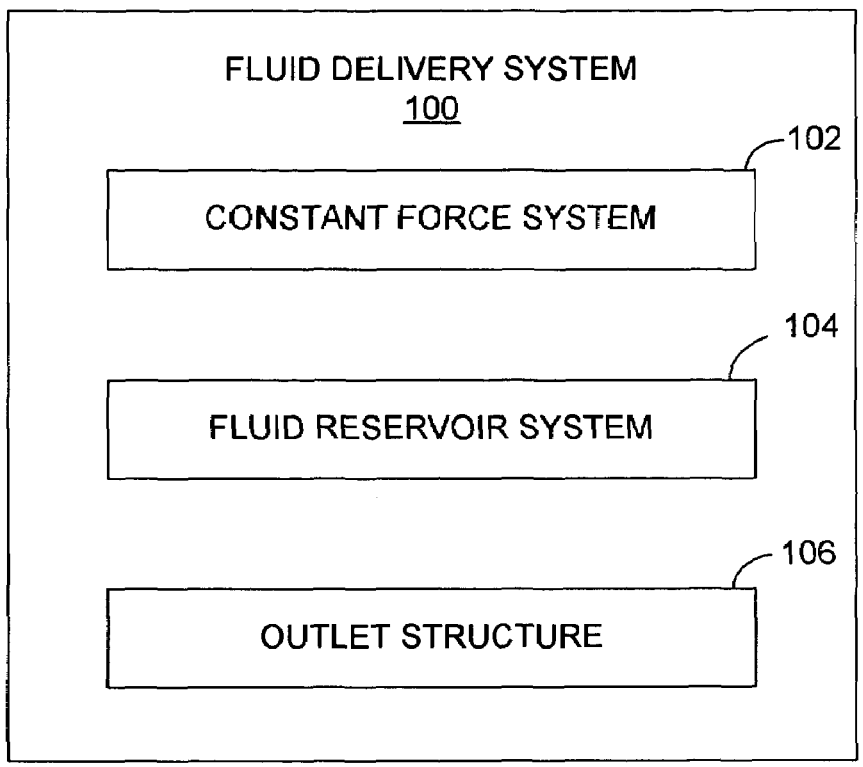
FIG. 1 is a block diagram of a representative embodiment of the fluid delivery system.

FIG. 1 illustrates a block diagram of a representative fluid delivery system 100 that includes, but is not limited to, a constant force system 102, a fluid reservoir system 104, and an outlet structure 106. In general, the constant force system 102 is coupled to the fluid reservoir system 104, which is fluidically coupled (e.g., in fluidic communication) to the outlet structure 106. The constant force system 102 can apply a constant force over time on the fluid reservoir system 104. Constant force acting on a constant contact area of the fluid reservoir system 104 causes a volume of the fluid to flow through the outlet structure 106 at a substantially constant pressure over time. In addition, the constant force system 102 uses little or no energy except for the energy inherent in the constant force system 102, which is described in more detail below.

The constant force system 102 can include, but is not limited to, one or more constant force springs, one or more constant force springs configured to apply a constant torque, one or more torsion springs, one or more constant torque springs, one or more constant torque springs configured to apply a constant force, and combinations thereof.

The fluid reservoir system 104 includes, but is not limited to, a fluid chamber containing a volume of a fluid and a delivery structure capable of causing the fluid to flow out of the fluid chamber. For example, the constant force springs of the constant force system 104 apply a force to the fluid chamber via the delivery structure, which results in a constant pressure on the fluid over time. In particular, the fluid reservoir system 104 includes, but is not limited to, a compressible fluid chamber and a fluid delivery structure (e.g., a piston or similar structure) disposed adjacent the compressible fluid chamber, which causes the fluid to flow from the fluid chamber when a force is applied to the structure. The fluid reservoir system 104 may include a sealing structure (e.g., a threaded end) that assists in forming a substantially leak-free seal with the outlet structure 106 and/or the delivery structure. The fluid chamber can be made of materials such as, but not limited to, metal, plastic, parylene, rubber, polydimethylsiloxane (PDMS), PVC, polycarbonate and combinations thereof.

The outlet structure 106 can include, but is not limited to, an outlet port through which fluid from the fluid reservoir system 104 can flow as one or more forces are applied to the fluid reservoir system 104. In addition, the outlet structure 106 may include a flow control device that can be opened and closed to permit flow of fluid through the outlet port. For example, constant force springs of the constant force system 102 apply a force to the fluid chamber via the delivery structure, which results in fluid flowing through the outlet port at a constant pressure once the flow control device is opened. The flow control device can be part of, or separate from, the outlet structure 106 and depends upon the particular application. The outlet structure 106 may also include an outlet sealing structure (e.g., a threaded end) that assists in forming a leak-free seal with the fluid reservoir system 104. The outlet structure 106 can be fluidically communicated to devices such as, but not limited to, a fuel cell, a microneedle array for drug delivery, lap-on-a-chip technologies, a genetic diagnostics system, and a pipette outlet.

Figure 2:
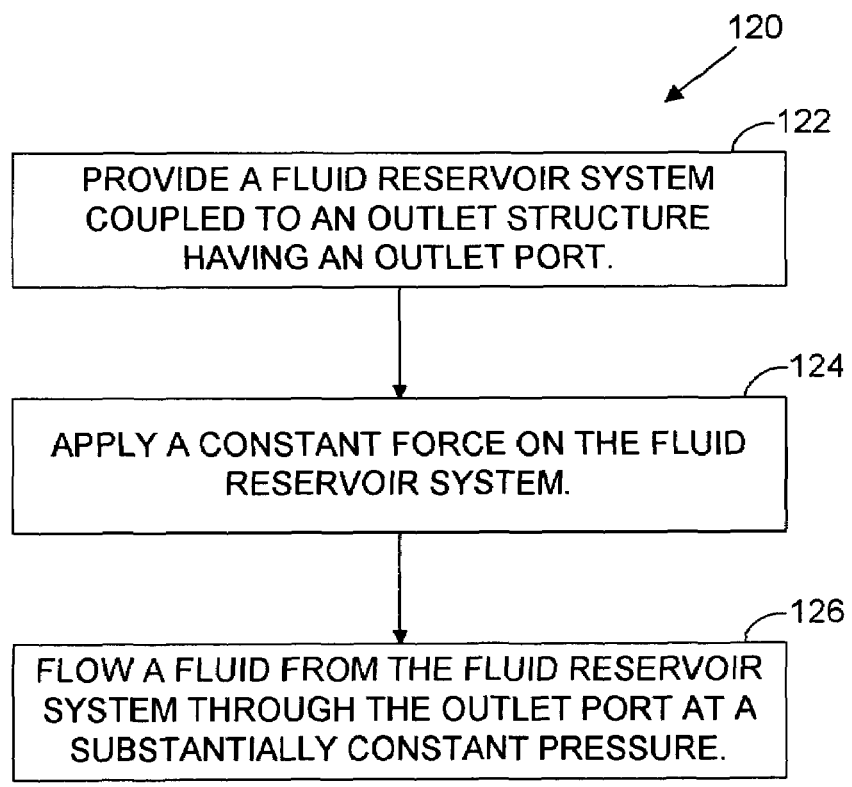
FIG. 2 is a flowchart illustrating an exemplary method of operating the fluid delivery system illustrated in FIG. 1.

FIG. 2 illustrates an exemplary method 120 of operating the fluid delivery system 100 described in reference to FIG. 1. In block 122, a fluid reservoir system 104 capable of dispensing fluid is provided, where the fluid reservoir system 104 includes a fluid chamber containing a fluid. In block 124, a constant force is applied to the fluid chamber distributed over a constant area. The constant force can be applied by one or more constant force springs as described above. In block 126, the constant force acting on a constant area of the fluid chamber is capable of causing the fluid to flow from the fluid chamber through the outlet structure 106 at a substantially constant pressure 126 over time, while consuming little or no additional energy.

Figure 3:
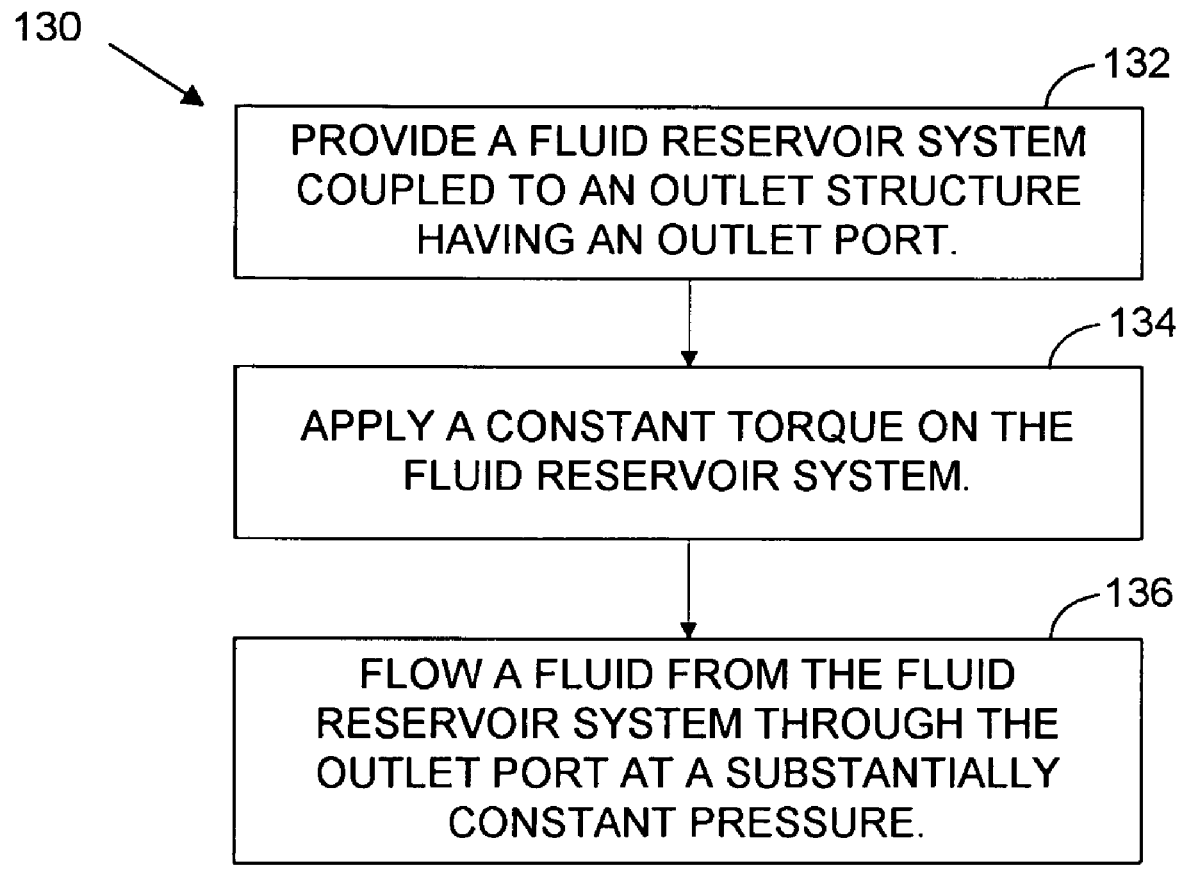
FIG. 3 is a flowchart illustrating another exemplary method of operating the fluid delivery system illustrated in FIG. 1.

FIG. 3 similarly illustrates an exemplary method 130 of operating the fluid delivery system 100 described in reference to FIG. 1. In block 132, a fluid reservoir system 104 capable of dispensing fluid is provided, where the fluid reservoir system 104 includes a fluid chamber containing a fluid. In block 134, a constant torque is applied to the fluid chamber. The constant torque can be applied by one or more constant torque and/or force springs as described above. In block 136, the constant torque is capable of causing the fluid to flow from the fluid chamber through the outlet structure 106 at a substantially constant pressure 136 over time, while consuming little or no additional energy.

Now having described the fluid delivery system in general, FIGS. 4-14 illustrate exemplary embodiments of the disclosure. These embodiments are not intended to limit the scope of any embodiment in this disclosure, but rather are intended to provide specific exemplary embodiments. Therefore, a person of ordinary skill in the art would understand that the components of the fluid delivery system and the configuration of the components within can be modified, and it is intended that these modifications be within the scope of the embodiments of this disclosure.

Figure 4:
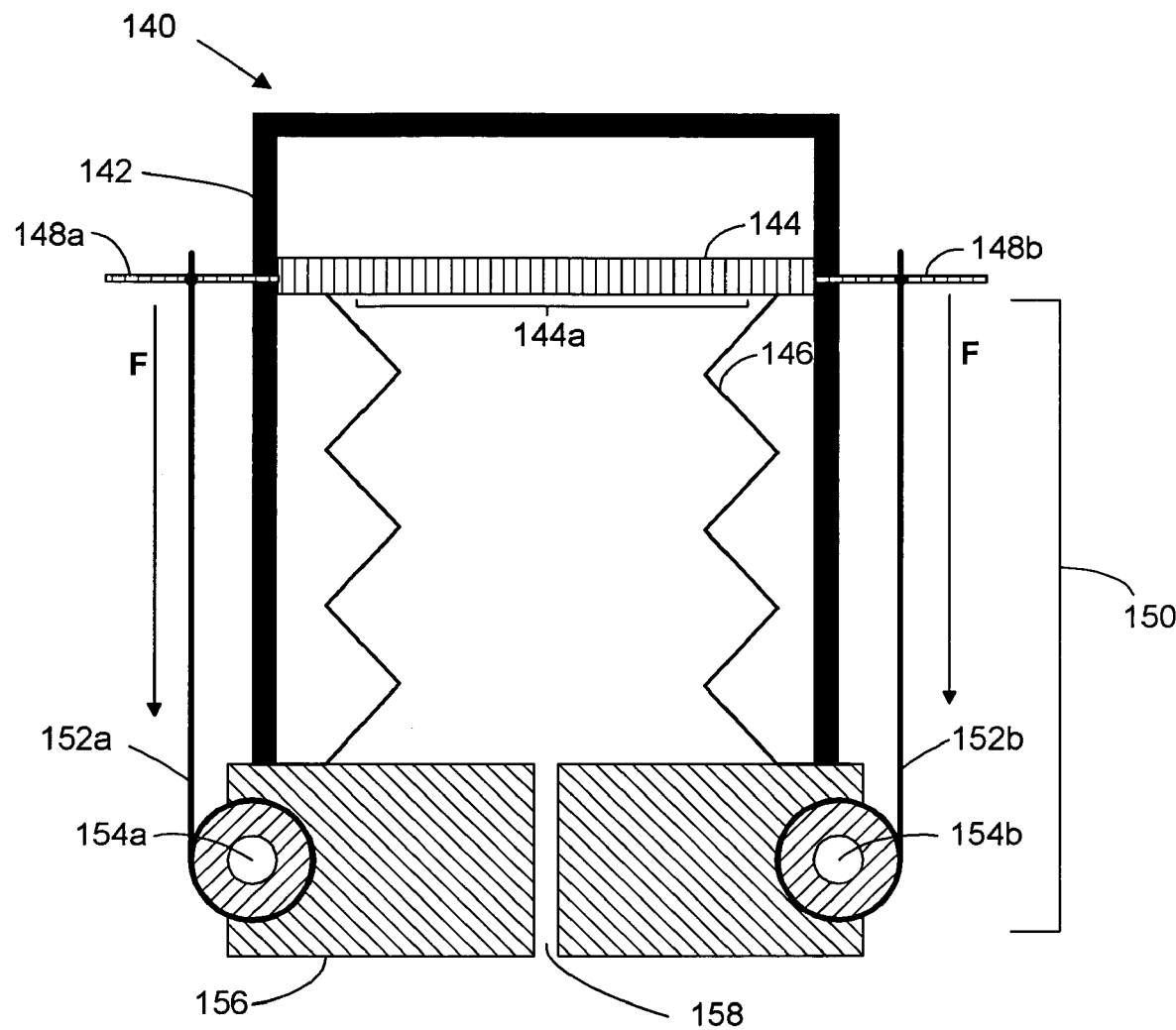
FIG. 4 is a cross-sectional view of an exemplary embodiment of the fluid delivery system illustrated in FIG. 1.

FIG. 4 illustrates an exemplary embodiment of a fluid delivery system 140 in which the fluid reservoir system 142 has a substantially linear shape and is coupled to a base 156 and the outlet structure 158. The fluid reservoir system 142 includes, but is not limited to, a fluid chamber 146 with a fluid delivery structure 144 (e.g., a piston) disposed within. Displacement of the fluid delivery structure 144 causes a volume of fluid within the fluid reservoir system 142 to flow through an outlet structure 158. The fluid reservoir system 142 in this particular embodiment also includes a compressible fluid chamber 146 (e.g., a flexible bellows) disposed within the chamber, and it is interposed between the fluid delivery structure 144 and outlet structure 158. The constant force system 150 includes a first 152a and a second 152b constant force spring, each having a first and a second end that are attached to the base 156 of the fluid delivery system 140 by the first end and to the fluid delivery structure 142 disposed within the fluid reservoir system 140 by the second end.

In the embodiment shown in FIG. 4, the exemplary fluid delivery structure 144 (e.g., piston), is driven by the two constant force springs 152a and 152b attached to the base 156 of the device at one end and to arms 148a and 148b located on the fluid delivery structure 144 at the other end. The springs 152a and 152b utilized in this example embodiment are similar to those taught by U.S. Pat. No. 4,635,755, which is incorporated herein by reference. The constant force springs 152a and 152b shown in this embodiment can be fastened to the base 156 via mechanisms 154a and 154b, respectively, allowing for the retraction of a constant force springs 152a and 152b as the fluid delivery structure 144 moves in response to the forces the springs 152a and 152b are applying to the fluid delivery structure 144. The constant force springs 152a and 152b can be fastened to drums 154a and 154b disposed about a ball bearing or any such low friction or friction minimizing system, thereby maximizing efficiency of the embodiment by reducing friction. An additional non-limiting example of a low friction system includes disposing the drums about a cylindrical surface and coating the point of contact between the drums and the cylindrical surface with a low friction material. A low friction material includes, but is not limited to, polytetrafluoroethylene, lubricating oil, lubricating grease, and combinations thereof The embodiment, when configured as shown, utilizes the two constant force springs 152a and 152b to balance the forces around the center of the fluid delivery structure 144. However, the embodiment can be configured to operate with as few as one, or three or more, constant force springs.

The compressible fluid chamber 146 can be charged or filled with fluid through the outlet structure 158 or any other valve or port that can be fluidically coupled to the fluid reservoir system 142. During this fluid charging process, positive displacement of the fluid delivery structure 144 results in the storage of energy into the constant force springs 152a and 152b, which is used to negatively displace the fluid delivery structure 144 in order to pump fluid through the outlet structure 158. Therefore, no external power supply is required for operation of the fluid delivery system 140. A person of ordinary skill in the art would recognize that the storage of energy in the constant force springs 152a and 152b can be accomplished by methods other than charging the fluid reservoir system 142. For example, the compressible fluid chamber 146 can be charged prior to placement within the fluid reservoir system 142, where the constant force springs 152a and 152b are in a stretched position.

A compressible fluid chamber 146 (e.g., a flexible bellows) can be disposed within the fluid reservoir system 142 in order to facilitate fluid storage and output. The compressible fluid chamber 146 can also be utilized to regulate the fuel injection pressure observed at the outlet structure 158 of the embodiment. The pressure is a function of the contact area 144a (e.g., area of the fluid delivery structure in contact with the compressible fluid chamber 146) between the fluid delivery structure 144 and compressible fluid chamber 146 and the forces applied by the constant force springs 152a and 152b (FIG. 4). The fuel injection pressure can be represented by the following relationship:

$$2F = P \times A$$

In this particular embodiment, the pressure can be adjusted by varying either the forces (F) applied by the constant force springs 152a and 152b, or the contact area (A) of the compressible fluid chamber 146 and fluid delivery structure 144.

Figure 5:
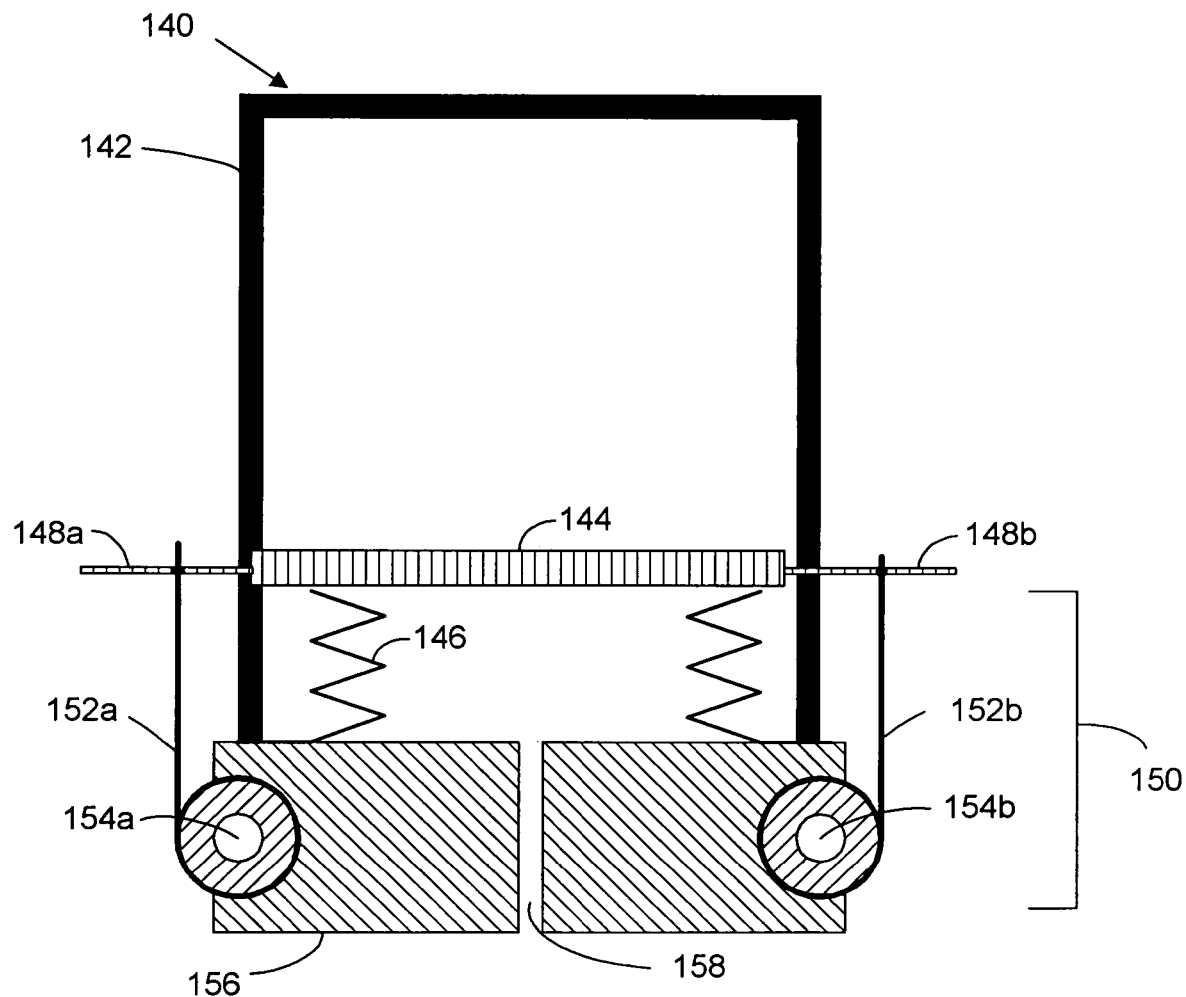
FIG. 5 is a cross-sectional view of an exemplary embodiment of the disclosure.

FIG. 5 illustrates the fluid delivery system 140 of FIG. 4 after the compressible fluid chamber 146 has been substantially compressed by a negative displacement of the fluid delivery structure 144 resulting from actuation by the constant force springs 152a and 152b. In this condition, the fluid delivery system 140 will flow a volume of the fluid displaced from the fluid reservoir system 142 through the outlet structure 158 at a substantially constant pressure over time as long as the outlet structure 158 is not encumbered by a flow control device or another flow limiting device. Additional details related to this embodiment 140 can be found in Luharuka et al., Sensors and Actuators A, 112, 2, 187-195 (2004), which is incorporated herein by reference.

Figure 6:
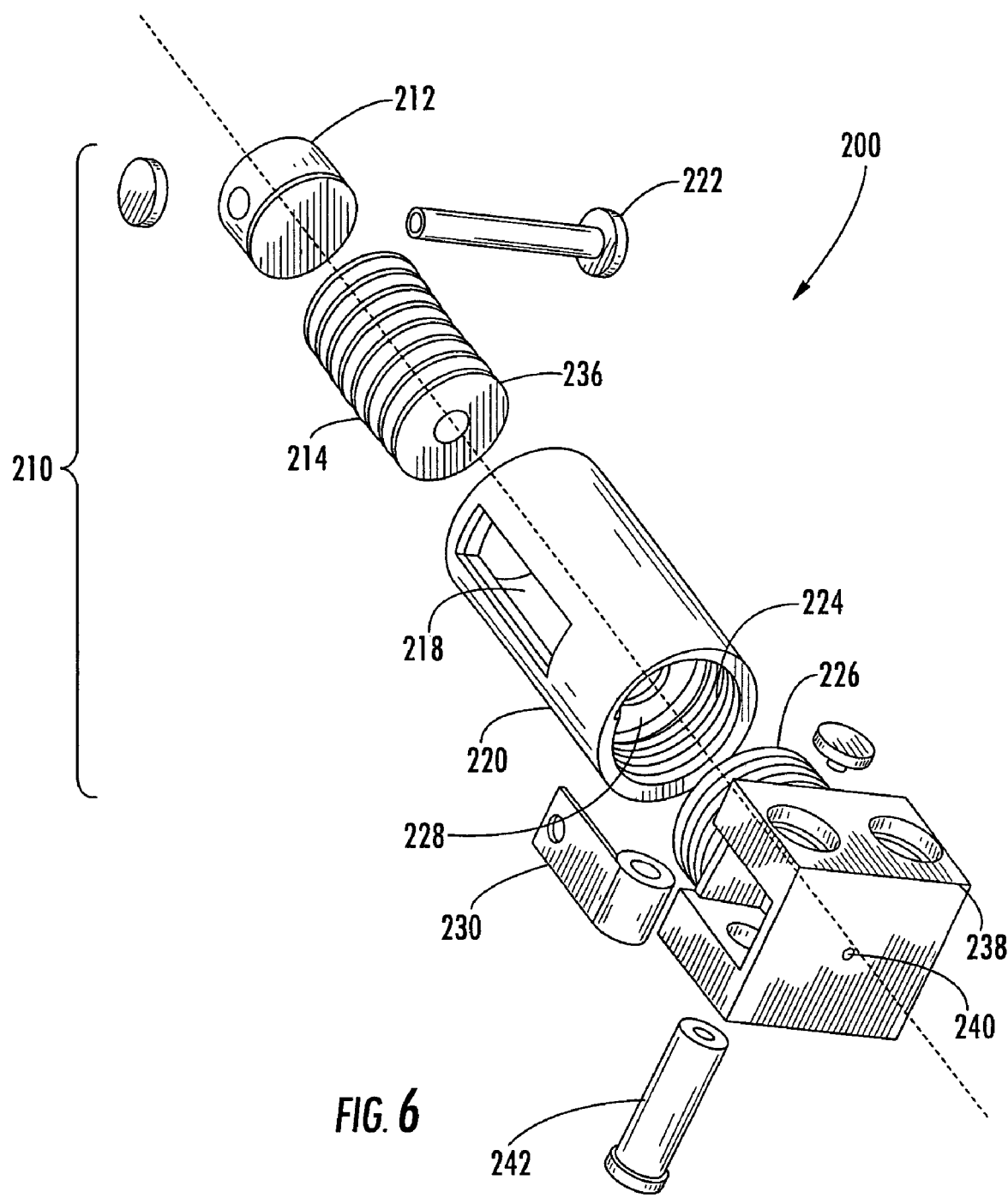
FIG. 6 is an exploded-perspective view of an exemplary embodiment of the fluid delivery system illustrated in FIG. 4.

FIG. 6 illustrates an exploded-perspective view of an exemplary embodiment of a fluid delivery system 200 and discloses how the various components of the embodiment 200 can be positioned in relation to one another. The fluid reservoir system 210 includes, but is not limited to, a hollowed channel 220 (e.g., a cylindrical structure) with a fluid delivery structure 212 (e.g., a piston) and a compressible fluid chamber 214 disposed therein. The compressible fluid chamber 214 is interposed between the fluid delivery structure 212 and the outlet structure 240. The constant force system includes two constant force springs 230 (only one shown) having a first end and a second end coupled to the base 238 by the first end and to the fluid delivery structure 212 by the second end. The constant force springs 230 are each mounted on take-up drums 242.

This embodiment of a fluid delivery system 200 shows an exemplary fluid delivery structure 212 that, when assembled, includes a cylindrical piston 212 with two arms 222 (one structure) extending from substantially opposite sides of the fluid delivery structure 212. The two arms 222 act as a fastening point on which the constant force springs 230 may attach and apply a constant force to actuate the fluid delivery structure 212. Furthermore, the outermost layer of the fluid reservoir system 210 as shown includes a hollowed channel 220 with openings 218 along the shaft of the hollowed channel 220. In this embodiment, the openings 218 provide a space through which the two arms 222 extend so that displacement of the fluid delivery structure 212 through the hollowed channel 220 may occur. The fluid reservoir system 210 and fluid delivery structure 212 as shown are cylindrical in shape, however, the shape of the fluid reservoir system 210 as well as components disposed therein can take many forms, such as, polygonal shapes.

FIG. 6 further shows one manner in which the fluid reservoir system 210 and outlet structure 240 are coupled to form a substantially leak-free seal. This coupling can be achieved by creating threadings of the opposite sex on the fluid reservoir system 224 and the outlet structure 226 and placing the skirt 236 of the depicted bellows 214 between a washer 228 integrated into the fluid reservoir system 210 and the head of the base 226. To complete the substantially leak-free seal, the two components are screwed together. A person of ordinary skill in the art would recognize that there are many ways to perform a substantially leak-free coupling. These methods include, but are not limited to, a glue or adhesive based seal or a quick connect coupler providing a substantially leak-free seal.

The constant force springs 230 may be mounted to the base 238 of the fluid delivery system 200 by fastening one end of each constant force spring 230 to a corresponding take-up drum 242 comprising a rotatable pillar so that the constant force spring 230 winds around a take-up drum 242 as the spring 230 actuates the fluid delivery structure 212. A person of ordinary skill in the art would appreciate other ways of mounting the constant force springs 230 to the base 238 including, but not limited to, fastening each constant force spring 230 to a bearing that is disposed on the base 238 and freely rotatable. A person of ordinary skill in the art would also recognize that a constant force spring 230 such as the one shown is one of many ways to actuate the fluid delivery structure 212. Any device that can apply a constant force may be used to actuate the fluid delivery structure 212 to cause fluid to flow through the outlet structure 240 at a substantially constant pressure.

Figure 7:
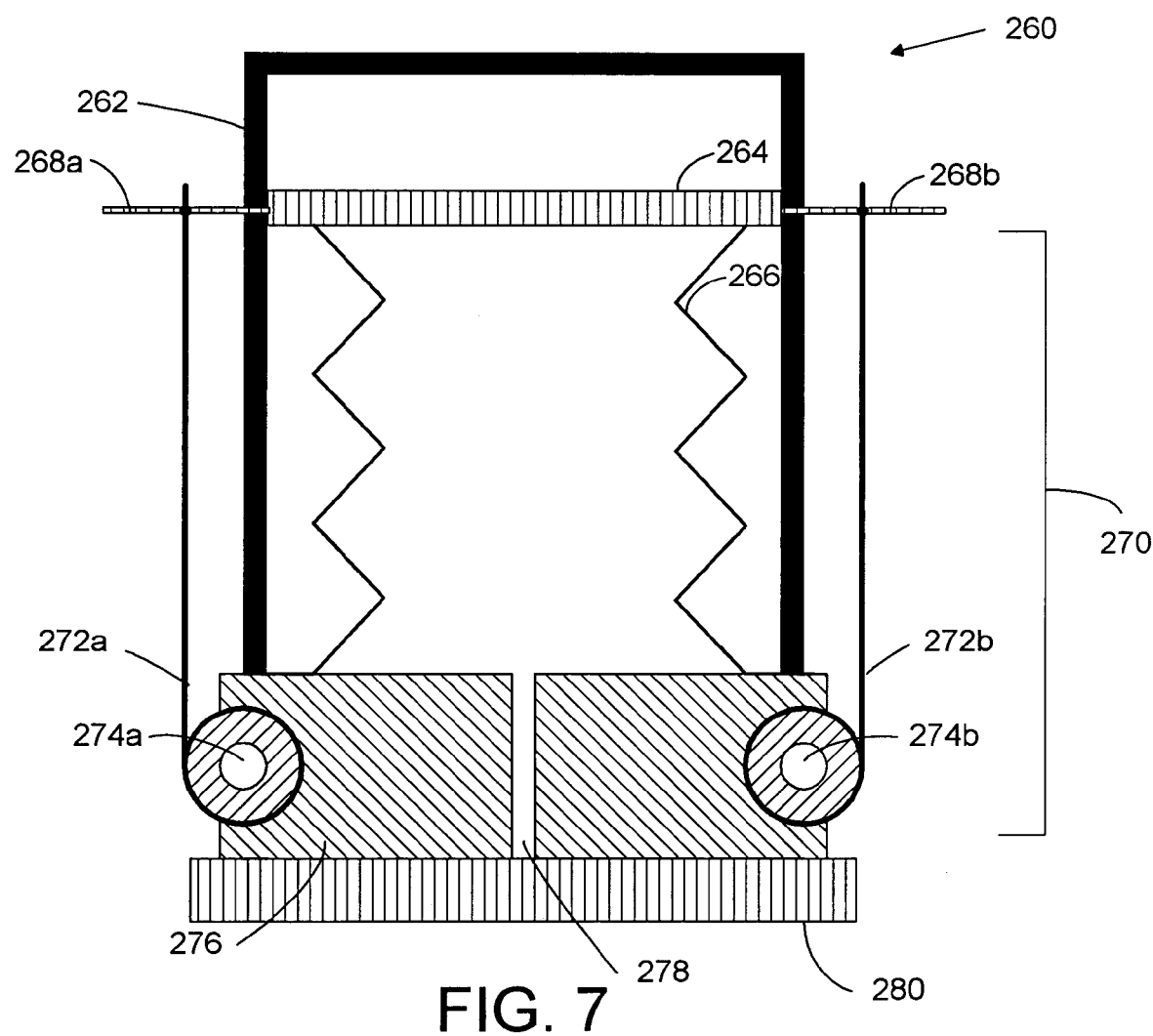
FIG. 7 is a cross-sectional view of an exemplary embodiment of the fluid delivery system illustrated in FIG. 1.

FIG. 7 illustrates a fluid delivery system 260 disposed directly adjacent to a direct methanol micro-fuel cell 280 in order to meet the fuel storage and delivery needs of the fuel cell 280. Although FIG. 7 illustrates one embodiment of the disclosure disposed directly on top of a micro-fuel cell 280, however a person of ordinary skill in the art would recognize that there are many ways to couple a fluid delivery system 260 and a fuel cell in order to meet the fluid delivery demands of the fuel cell.

Figure 8:
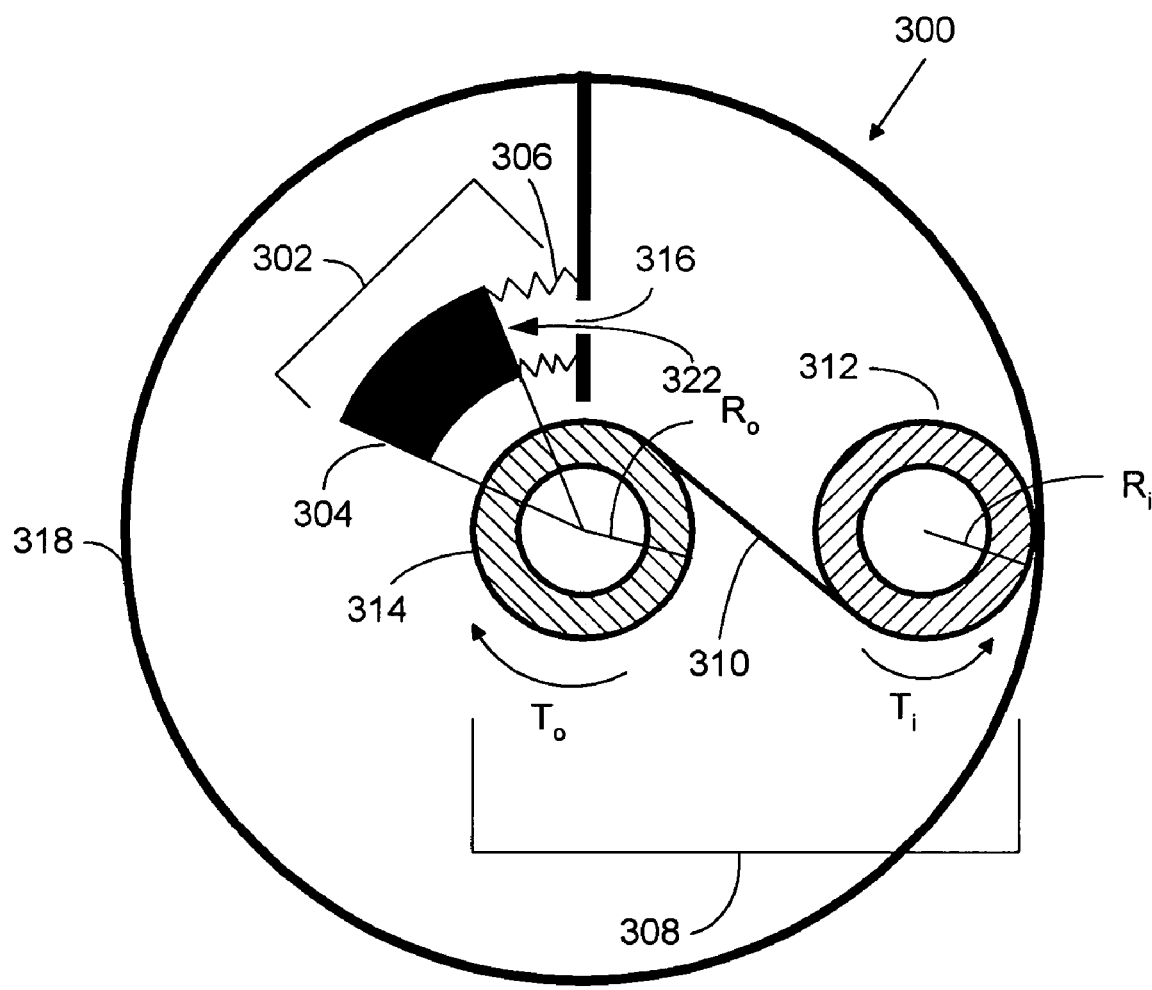
FIG. 8 is a cross-sectional view of another exemplary embodiment of the fluid delivery system illustrated in FIG. 1.

FIG. 8 illustrates an exemplary embodiment of a fluid delivery system 300 with a rotary design. The constant force system is configured to act as a constant torque system 308 and apply a constant torque on the fluid reservoir system 302. In this embodiment the constant torque system 308 includes, but is not limited to, an output drum 314 and a take-up drum 312 coupled by a constant torque spring 310. The output drum 314 is coupled to the fluid reservoir system 302. The fluid reservoir system 302 in this exemplary embodiment includes a delivery structure 304 (e.g., a piston) coupled to a compressible fluid chamber 306 (e.g., a bellows). The fluid reservoir system 302, specifically the compressible fluid chamber 306, is fluidically coupled to an outlet structure 316 via a substantially leak-free seal.

The fluid delivery system 300 operates by the application of a constant torque by the constant torque system 308 on the fluid reservoir system 302. The applied torque causes fluid to flow from the compressible fluid chamber 306 through the outlet structure 316 at a substantially constant pressure. In the embodiment of FIG. 8, the fluid delivery structure 304 is a curved piston, and the compressible fluid chamber 306 is a similarly curved bellows. The flexible bellows 306 in this embodiment 300 has a curvature with substantially the same radius as that swept by the curved piston. This ensures that the fluid delivery structure 304 (e.g. curved piston), at all positions, applies a constant normal force on the compressible fluid chamber 306. As a result, the fluid pressure inside the compressible fluid chamber 306 is substantially constant over its length of movement (i.e., stroke length). In another embodiment, a system/device in which both the magnitude and direction of force applied on a compressible fluid chamber is changing, can also be used. In this embodiment, the contact area between a compressible fluid chamber and a fluid delivery structure would change to compensate for the variation in the force applied.

The fluid delivery system 300 in FIG. 8 is implemented using a single constant torque spring 310, a spring that applies a torque on the output drum 314. The spring 310 utilized in this example embodiment is similar to that taught by U.S. Pat. No. 4,635,755, which is incorporated herein by reference. The output drum 314 is fastened to the fluid reservoir system 302. When a torque is applied to the output drum 314, the output drum 314 causes the fluid delivery structure 304 to compress the compressible fluid chamber 306, which in turn causes fluid to flow through the outlet structure 316. The outlet structure 316 can be sealed with a valve or any other device to stop the flow of fluid even if the output drum 314 is causing a torque to be applied to the fluid reservoir system 302. The flow through the outlet structure 316 may be stopped by numerous methods appreciated by a person of ordinary skill in the art, including, but not limited to, restraining the constant torque spring 310, so that it does not cause the output drum to actuate the fluid delivery structure 304.

The fluid delivery system 300 can be charged or filled with fluid through the outlet structure 316 or any other valve or port that can be fluidically coupled to the fluid reservoir system 302, or the fluid reservoir system 302 may be filled prior to assembly of the fluid delivery system 400. During this fluid charging process, positive displacement of the fluid delivery structure 304 results in the storage of energy into the constant force springs 310, which is later used to negatively displace the fluid delivery structure 304 in order to flow fluid through the outlet structure 316. Therefore, no external power supply is required for operation of the fluid delivery system 300, but an external power supply can be used for potential applications. A person of ordinary skill in the art would recognize that the storage of energy in the constant force spring 310 may be accomplished by methods other than charging the fluid reservoir system 302.

The fluid reservoir system 302 can be implemented as a disposable and/or insertable cartridge. In such a configuration, the fluid reservoir system 302 can be partially or completely filled with a volume of fluid prior to assembly into the fluid delivery system 300. As a volume of fluid within the fluid reservoir system 302 is exhausted, it may be replaced by another fluid reservoir system 302 that has been charged outside of the fluid delivery system 300.

The compressible fluid chamber 306 (e.g., flexible bellows) can be disposed within the fluid reservoir system 302 in order to facilitate fluid storage and output. The compressible fluid chamber 306 can also be utilized to regulate the fuel injection pressure observed at the outlet structure 316 of the embodiment. The pressure is a function of the contact area between the fluid delivery structure 304 and compressible fluid chamber 306, the torque applied on the output drum 314, and radii of the output 314 and take-up 312 drums. The fuel injection pressure can be represented by the following relationship:

$$P \times A \times R_{mean} = T_o$$

$R_{mean}$ represents the mean of the radii of the piston 304 on the output drum 314, and $T_o$ represents the torque applied on the output drum 314 by the constant torque spring 310. In this particular embodiment, the output pressure (P) can be adjusted by varying the contact area (A) 322 of the compressible fluid chamber 306 and fluid delivery structure 304, the radii of the output 314 and take-up 312 drums, $R_o$ and $R_i$, or the torque applied by the constant torque spring 310.

FIG. 8 illustrates a take-up drum 312 that is freely rotatable. The constant torque spring 310 in this embodiment winds around the take-up drum 312 as the output drum 314 is actuated. $T_o$ and $T_i$ are applied against each drum 312 and 314 in opposite directions relative to their respective axes of rotations. A person of ordinary skill in the art would appreciate that the teachings in the disclosure may be implemented with the use of a torque application device other than a constant torque spring. As one non-limiting example, a torsion spring may be fixed at one end and fastened to the fluid delivery structure 304 by its other end, which removes the need for take-up drum 312 because there is no longer a need to capture the constant torque spring as it unwinds from the output drum 314. Other devices that apply a constant torque may be used to actuate the fluid delivery structure 304. Additional details related to this embodiment can be found in Luharuka et al., Sensors and Actuators A, 112, 2, 187-195 (2004), which is incorporated herein by reference.

Figure 9:
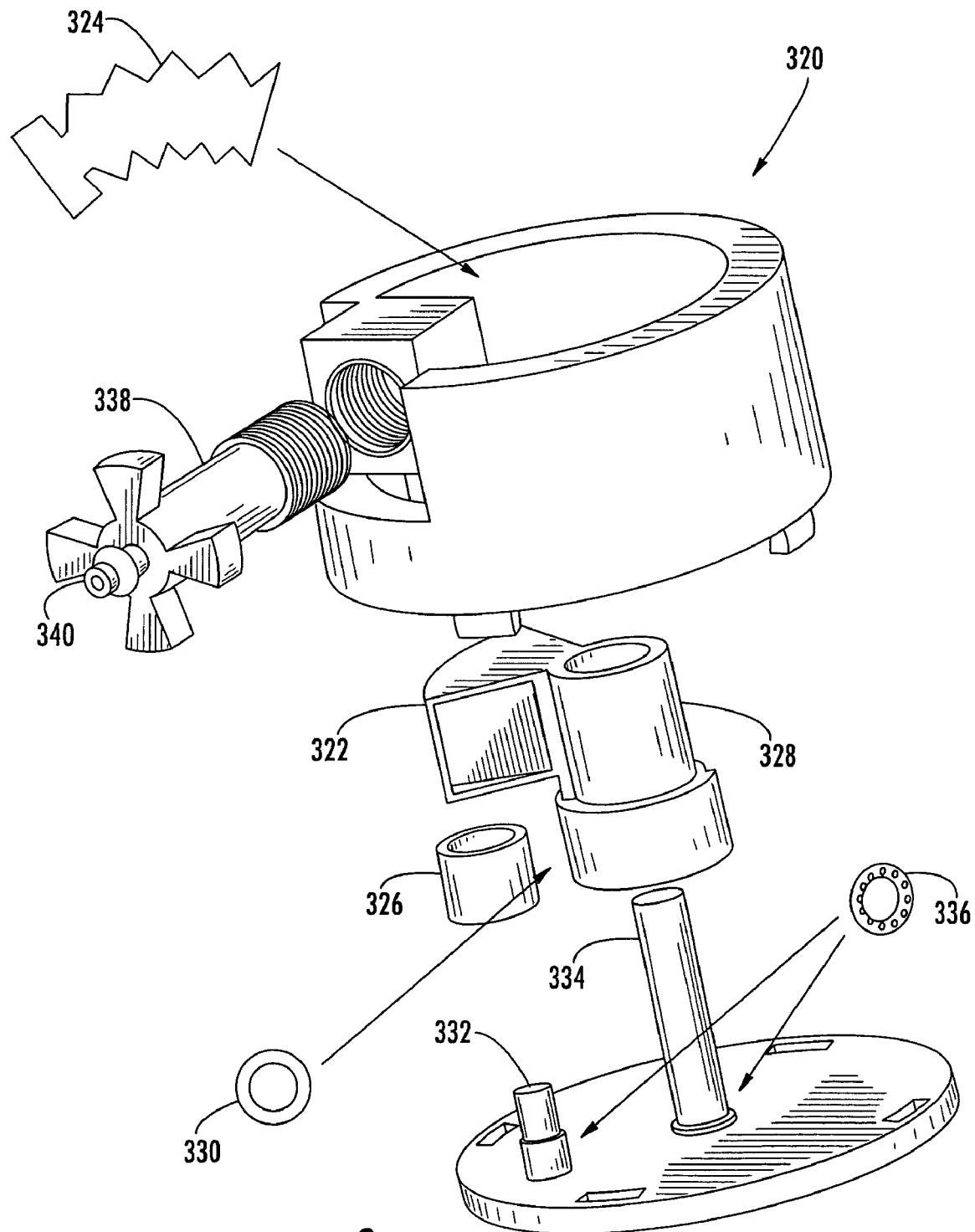
FIG. 9 is an exploded-perspective view of an exemplary embodiment of the fluid delivery system illustrated in FIG. 8.

FIG. 9 illustrates an exploded-perspective view of an example embodiment of a fluid delivery system 320 and its components. This embodiment utilizes a constant torque spring 330 that couples a take-up drum 326 and an output drum 328 and provides a torque that causes the fluid delivery system 320 to flow fluid through an outlet structure 338 at a substantially constant pressure. The fluid reservoir system includes, but is not limited to, a fluid delivery structure 322 (e.g., a piston) coupled to the output drum 328, and a compressible fluid chamber 324 interposed between the fluid delivery structure 322 and an outlet structure 338. The fluid reservoir system is fluidically coupled to the outlet structure 338 via the compressible fluid chamber 324. The take-up drum 326 and output drum 328 are disposed about ball bearings 336 in this exemplary embodiment 320. Other ways to allow the take-up drum 326 and output drum 328 the ability to rotate include, but are not limited to, disposing the drums about a bush bearing or a surface coated with a low friction material including, but not limited to, polytetrafluoroethylene, lubricating oil, lubricating grease, and combinations thereof.

FIG. 9 also illustrates an exemplary way to implement an outlet structure 338 in accordance with the teachings of the present disclosure. A person of ordinary skill in the art would recognize that the outlet structure 338 may additionally be implemented at least on the top or bottom of the exemplary embodiment with a multitude of different outlet structures other than the pinhole structure 340 depicted.

Figure 10:
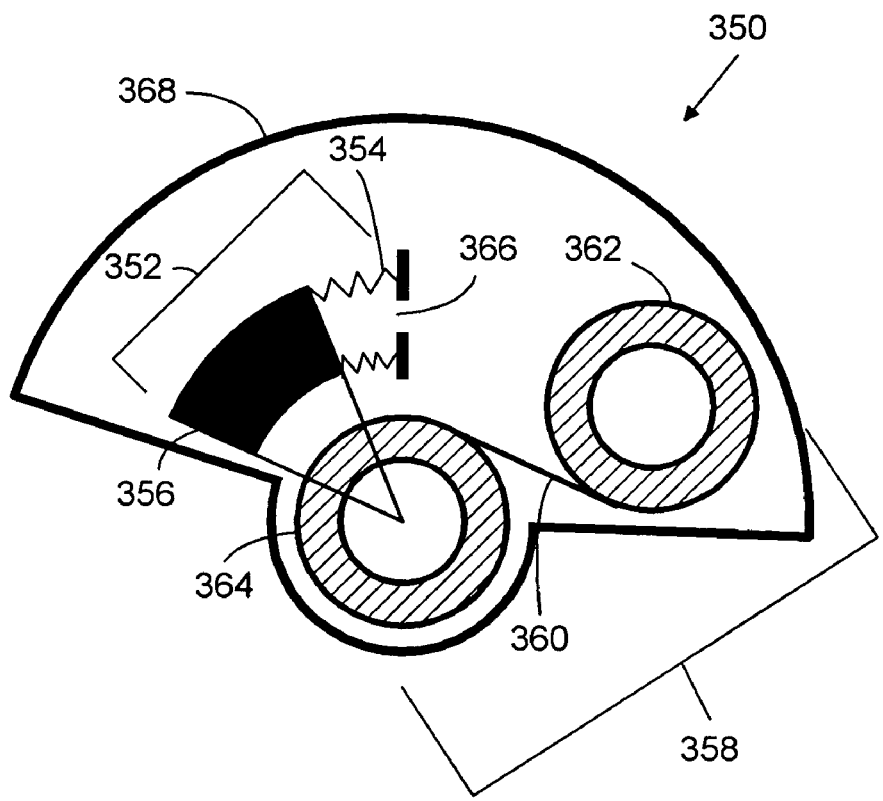
FIG. 10 is a cross-sectional view of another exemplary embodiment of the fluid delivery system illustrated in FIG. 8.
Figure 11:
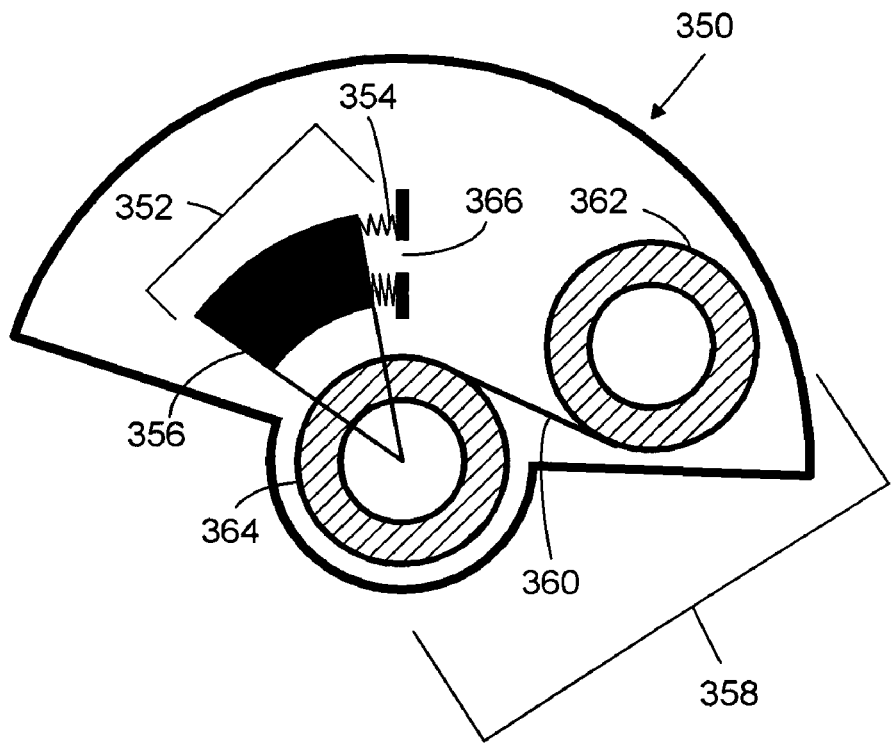
FIG. 11 is a cross-sectional view of another exemplary embodiment of the fluid delivery system illustrated in FIG. 8.

FIG. 8 illustrates a fluid delivery system 300 that is substantially circular in design, however a person of ordinary skill in the art would recognize that a portion of the volume within the wall 318 may be removed to reduce the size of the embodiment 300. FIGS. 10 and 11 illustrate a non-limiting exemplary way that the size of a fluid delivery system 350 may be reduced by removing unused volume from the embodiment in FIG. 8. A person of ordinary skill in the art would also appreciate that it may not be necessary for an embodiment of the disclosure to have walls 368 of any kind as long as a force or a torque system 358 is able to apply a force or a torque on a fluid reservoir system 352 in order to cause fluid to flow through an outlet structure 366 at a substantially constant pressure. The torque is generated from the constant torque spring 360 and the take-up drum 362. A person of ordinary skill in the art would appreciate that the size of an embodiment can be reduced as much as feasible as long as the fluid reservoir system 352 is able to accommodate a volume of fluid sufficient for a particular application.

FIG. 11 illustrates the fluid delivery system 350 with a fluid delivery structure 356 that has been actuated to compress a compressible fluid chamber 354. The output drum 364 applies a torque on the fluid delivery structure 356 (e.g., a piston) to cause it to rotate about the axis of rotation of the output drum 364, thereby compressing the compressible fluid chamber 354 and flowing fluid through the outlet structure 366 at a substantially constant pressure. The torque is generated from the constant torque spring 360 and the take-up drum 362.

Figure 12:
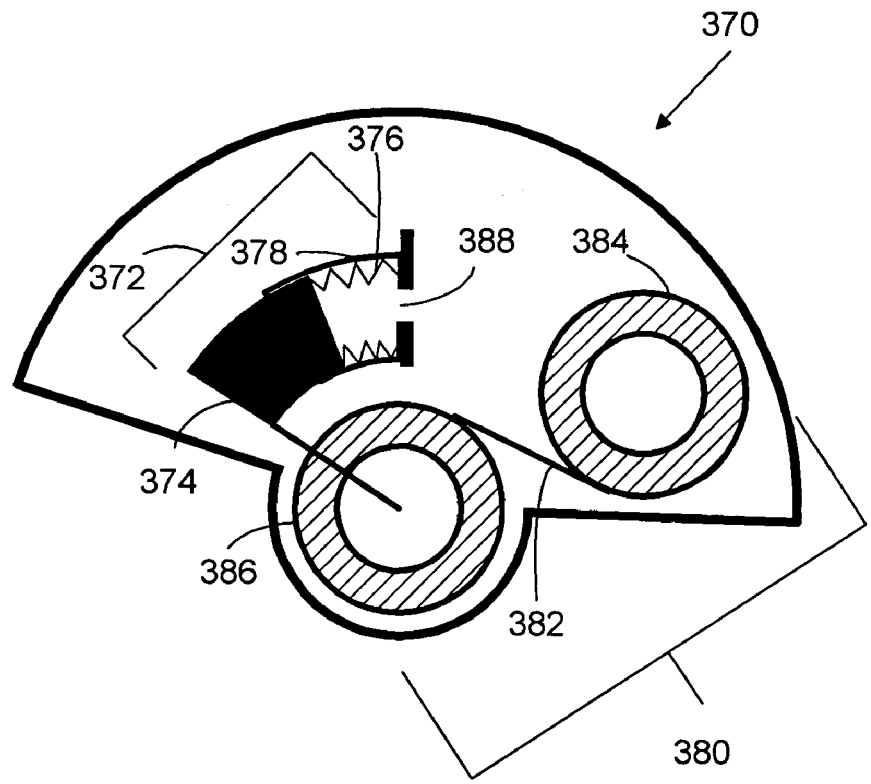
FIG. 12 is a cross-sectional view of another exemplary embodiment of the fluid delivery system illustrated in FIG. 1.

FIG. 12 illustrates an exemplary embodiment of a fluid delivery system 370 with an alternative arrangement of a fluid reservoir system 372. The fluid reservoir system 372 as depicted includes a channel 378 in which the compressible fluid chamber 376 sits. The fluid delivery structure 374 actuates through the channel 378 to compress the compressible fluid chamber 376. If the constant torque system 380 applies a constant torque on the fluid delivery structure 374 within the fluid reservoir system 372, and the contact area between the fluid delivery structure 374 and compressible fluid chamber 376 remains constant, then a fluid contained within the fluid reservoir system 372 flows through the outlet structure 388 at a substantially constant pressure. The output drum 384 applies a torque on the fluid delivery structure 374 (e.g., a piston) to cause it to rotate about the axis of rotation of the output drum 386, thereby compressing the compressible fluid chamber 354 and flowing fluid through the outlet structure 366 at a substantially constant pressure. The torque is generated from the constant torque spring 382 and the take-up drum 384.

Figure 13:
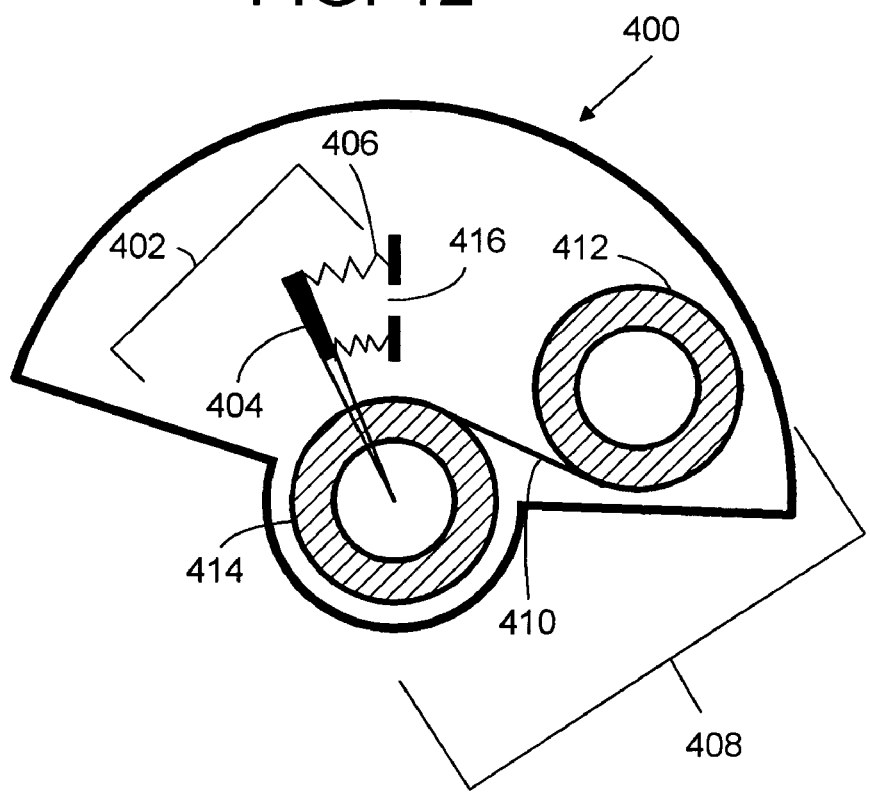
FIG. 13 is a cross-sectional view of another exemplary embodiment of the fluid delivery system illustrated in FIG. 1.

FIG. 13 illustrates and exemplary embodiment of a fluid delivery system 400 with a fluid reservoir system 402 including a fluid delivery structure 404 (e.g., a piston) whose size has been reduced relative to the fluid delivery structure 374 in FIG. 12. The constant torque system 408 is similar to the constant torque system 380 in FIG. 12. The output drum 414 applies a torque on the fluid delivery structure 404 (e.g., a piston) to cause it to rotate about the axis of rotation of the output drum 414, thereby compressing the compressible fluid chamber 406 and flowing fluid through the outlet structure 416 at a substantially constant pressure. The torque is generated from the constant torque spring 410 and the take-up drum 412.

A person of ordinary skill in the art would recognize that the size of the fluid delivery structure 402 or the size of any and all parts in an embodiment of a fluid delivery system 400 may be reduced to reduce the size of the embodiment for various microfluidic or miniature fluidic applications. An embodiment of a fluid delivery system 400 may be sized as small as feasible as long as an embodiment is able to accommodate a volume of fluid appropriate for a potential application of a fluid delivery system 400.

Figure 14:
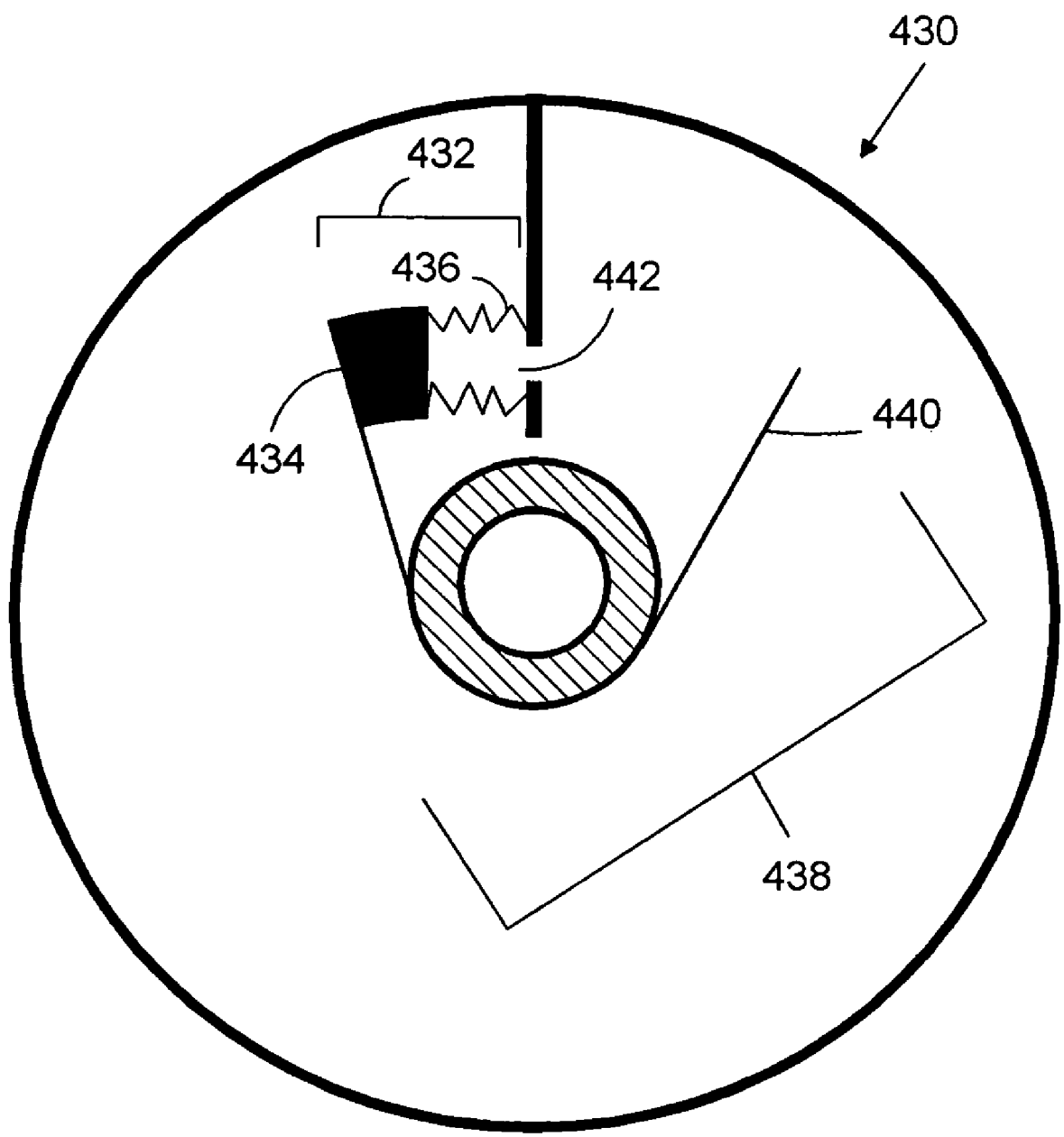
FIG. 14 is a cross-sectional view of another exemplary embodiment of the fluid delivery system illustrated in FIG. 1.

FIG. 14 illustrates an exemplary embodiment of a fluid delivery system 430 with a constant torque system 438 that utilizes a torsion spring 440 to actuate a fluid delivery structure 434 within the fluid reservoir system 432 to cause a fluid contained within the fluid reservoir system 432 (i.e., the compressible fluid chamber 436) to flow through the outlet structure 442 at a substantially constant pressure. In this exemplary configuration, there is no need for a take-up drum because a torsion spring 440 does not unwind as another type of spring may unwind. A person of ordinary skill in the art would recognize that the need for a take-up drum may also be removed by implementing the teachings of the disclosure in other ways, and this embodiment should be construed as the singular way. The use of an alternative spring, such as the torsion spring 440 in this embodiment 430, may also allow further size reduction of a fluid delivery system 430.

The structural components of an embodiment of a fluid delivery system 100, 140, 200, 260, 300, 320, 350, 370, 400, 430 may be fabricated using stereolithography, which allows for fabrication of small components of complex geometries. However, a person of ordinary skill in the art would recognize that the components of the device can be fabricated using a number of techniques utilizing different materials. The components of the embodiment may be fabricated of a photosensitive polymer using stereolithography, a high strength plastic using an injection molding process, steel, a metal alloy, or any combination thereof, but the materials comprising the components are not limited to the above.

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

Therefore, at least the following is claimed:

1. A microfluidic pump, comprising:
a fluid reservoir system that includes a fluid chamber for holding a volume of a fluid;
an outlet structure having an outlet port, wherein the fluid reservoir system is fluidically coupled to the outlet port;
a constant force system coupled to the fluid reservoir, wherein the constant force system is adapted to apply a force to the fluid chamber, wherein the force causes the volume of the fluid to flow out of the fluid chamber and through the outlet port at a substantially constant pressure;
wherein the constant force system includes a constant torque system rotationally coupled to the fluid reservoir system, wherein the constant torque system applies a torque on the fluid chamber to cause the volume of the fluid to flow out of the fluid chamber and through the outlet port at a substantially constant pressure; and
wherein the constant torque system further comprises:
an output drum connected to the fluid reservoir system; and
a constant torque device that applies a torque on the output drum, causing the volume of the fluid to flow out of the fluid chamber and through the outlet port at a substantially constant pressure.

2. The microfluidic pump of claim 1, wherein the constant torque system further comprises:
a take-up drum, wherein the output drum and the take-up drum are positioned about substantially parallel axes of rotation; and
the constant torque device is fastened to the output drum and the take-up drum, wherein the constant torque device applies a torque on the output drum and the take-up drum in opposite directions about their respective axes of rotation.

3. The microfluidic pump of claim 1, wherein the output drum comprises:
a rotatable pillar coupled to the fluid reservoir system such that the rotation of the output drum corresponds to the volume displaced from the fluid chamber through the outlet port.

4. The microfluidic pump of claim 3, wherein the rotatable pillar is disposed about a low friction system.

5. The microfluidic pump of claim 4, wherein the low friction system is selected from a ball bearing, a bush bearing, a sleeve bearing, and combinations thereof.

6. The microfluidic pump of claim 4, wherein:
the rotatable pillar comprises a hollowed pillar;
the low friction system is configured such that the rotatable pillar rotates about a cylindrical surface; and
the cylindrical surface and at least the portion of the rotatable pillar contacting the cylindrical surface are coated with a low friction material, wherein the low friction material is selected from: polytetrafluoroethylene, lubricating oil, lubricating grease, or combinations thereof.

7. The microfluidic pump of claim 2, wherein the constant torque device comprises a constant torque spring.

8. The microfluidic pump of claim 2, wherein:
the output drum comprises a rotatable pillar coupled to the fluid reservoir system such that the rotation of the output drum corresponds to the volume displaced from the fluid reservoir system through the outlet port; and
the take-up drum comprises a rotatable pillar.

9. The microfluidic pump of claim 8, wherein:
the rotatable pillar is disposed about a first bearing; and
the take-up drum is disposed about a second bearing, wherein each of the first
bearing and the second bearing are selected from: a ball bearing, a bush bearing, a sleeve bearing, and combinations thereof.

10. The microfluidic pump of claim 8, wherein the rotatable pillars rotate about a low friction system.

11. The microfluidic pump of claim 10, wherein:
the rotatable pillars comprise hollowed pillars;
the rotatable pillars rotate about cylidrical surfaces; and
the cylidrical surfaces and at least the portion of the rotatable pillars contacting the cylindrical surfaces are coated with a low friction material wherein the low friction material is selected from: polyfluoroethylene, lubricating oil, lubricating grease, and combinations thereof.

12. The microfluidic pump of claim 1, wherein the fluid reservoir system comprises:
    a delivery structure rotationally coupled to the constant torque system; and
    wherein the fluid chamber is a compressible fluid chamber, the compressible fluid chamber interposed between the delivery structure and the outlet port, wherein a torque applied to the delivery structure causes the delivery structure to compress the compressible fluid chamber, resulting in fluid being flowed through the outlet port at a pressure substantially constant over time.

13. The microfluidic pump of claim 12, wherein the compressible fluid chamber is chosen from: a flexible bellows, a flexible bladder, a balloon, and combinations thereof.

14. A microfluidic pump comprising:
    a fluid reservoir system including a curved fluid chamber and a curved delivery structure rotationally coupled to the torque system;
    an outlet structure having an outlet port, the outlet port in fluidic communication with the fluid reservoir system; and
    a constant torque system rotationally coupled to the torque system, wherein the torque system includes:
        an output drum, the output drum rotationally coupled to the fluid reservoir system such that the rotation of the output drum actuates the delivery structure,
        a take-up drum, and
        a constant torque spring, the constant torque spring fastened to the output drum and take-up drum such that the constant torque spring applies a torque in substantially opposite directions about the respective axes of rotation of the output drum and the take-up drum and fastened such that the constant torque spring winds around the output drum and the take-up drum.

15. The microfluidic pump of claim 14, further comprising:
    a base on which the fluid reservoir system is disposed, wherein the fluid reservoir system further comprises a delivery structure disposed adjacent the fluid reservoir system; and
    wherein the constant torque system is coupled to the delivery structure, causing the delivery structure to displace a volume of fluid from the fluid chamber through the outlet port at a substantially constant pressure.

16. The microfluidic pump of claim 15, wherein the fluid chamber includes a compressible fluid chamber interposed between the fluid delivery structure and the outlet structure.

17. The microfluidic pump of claim 16, wherein the compressible fluid chamber is chosen from: a flexible bellows, a balloon, a flexible bladder, and combinations thereof.

18. A method of pumping fluid, comprising:
    providing a fluid reservoir system fluidically coupled to an outlet structure having an outlet port, wherein the fluid reservoir system includes a fluid chamber having a volume of fluid and a piston coupled to the fluid chamber;
    providing a constant torque system rotationally coupled to the fluid reservoir system;
    applying a constant torque on the volume of fluid using the constant torque system, wherein the constant torque applied to a constant contact area of the piston causes the volume of the fluid to flow through the outlet port at a substantially constant pressure;
    wherein the constant torque system further comprises:
        an output drum connected to the fluid reservoir system; and
        a constant torque device that applies a torque on the output drum,
        causing the volume of the fluid to flow out of the fluid chamber and through the outlet port at a substantially constant pressure.

* * * * *